United States Patent [19]

Brownrigg

[11] Patent Number: 4,678,585

[45] Date of Patent: Jul. 7, 1987

[54] PROCESS FOR ALUMINA RECOVERY

[75] Inventor: Neville J. Brownrigg, Wanneroo, Australia

[73] Assignee: American Cyanamid Company, Stamford, Conn.

[21] Appl. No.: 506,099

[22] Filed: Jun. 20, 1984

Related U.S. Application Data

[63] Continuation of Ser. No. 335,499, Dec. 30, 1981, abandoned, which is a continuation-in-part of Ser. No. 171,616, Jul. 23, 1980, abandoned.

[51] Int. Cl.$^4$ ................................................ C02F 1/54
[52] U.S. Cl. ...................................... 210/727; 210/734
[58] Field of Search ........................ 210/727, 733, 734; 423/119, 121, 127

[56] References Cited

U.S. PATENT DOCUMENTS

| | | | |
|---|---|---|---|
| 3,374,143 | 3/1968 | Stephenson | 210/734 |
| 3,445,187 | 5/1969 | Sibert | 210/733 |
| 3,479,282 | 11/1969 | Chamot et al. | 210/734 |
| 3,479,284 | 11/1969 | Lees | 210/734 |
| 3,578,586 | 5/1971 | Gal et al. | 210/734 |

*Primary Examiner*—Benoit Castel
*Attorney, Agent, or Firm*—Michael J. Kelly; John W. Cornell; Frank M. Van Riet

[57] ABSTRACT

Aqueous suspensions of red mud are effectively removed from the Bayer process for making alumina by the addition to at least the first stage of the caustic recovery circuit of a flocculant selected from the group consisting of starch, homopolymers of acrylic acid or acrylates, copolymers of acrylic acid or acrylates containing at least 80 molar percent acrylic acid or acrylate monomers and combinations thereof and subsequent addition to later, more dilute stages in the caustic recovery circuit of a copolymer containing from about 35 to 75 molar percent of acrylic acid or acrylate and from about 65 to 25 molar percent of ethylenically unsaturated polymerizable monomers.

8 Claims, No Drawings

PROCESS FOR ALUMINA RECOVERY

BACKGROUND OF THE INVENTION

The instant invention is directed to a process of alumina manufacture via the Bayer process. The Bayer process is the almost universally used process for the manufacture of alumina. In its broadest aspects, this method is carried out almost exclusively in aqueous solution, and is achieved by reaction of bauxite and a strong base such as caustic soda or lime in steam heated autoclaves whereby the alumina is transformed into a soluble aluminate form. In this step, a considerable amount of insoluble impurities results or is released from the bauxite, which recrement must be separated from the desired alumina constituent. These residues commonly known as red muds include iron oxides, sodium aluminosilicate, titanium oxide and other materials. Generally these muds appear as very fine particles which are difficult to separate out. Yet the red muds which usually constitute about 10 to 50% by weight of the ore must be rapidly and cleanly separated from the solubilized alumina liquor in order to make this particular step economically efficient. If the rate of separation is too slow, output is materially diminished and overall process efficiency impaired. Likewise, if the separation is not clean, the resultant alumina in the form of aluminate is somewhat crude and undesirable for a number of end-uses. The insoluble impurities present in the alumina as carry-through from the manufacturing process tend to add extraneous non-active matter into the specific media, such as water, being treated with aluminate for a variety of purposes. For example, low grade sodium aluminate containing relatively large amounts of mud impurities when used to treat water results in a situation of increased tendency to form slime masses as the direct result of the insoluble impurities present, which masses tend to foul feeding equipment. Also, if the crude sodium aluminate contains substantial amounts of impurities as an admixture, solution problems are quite difficult to overcome if the aluminate is fed in the form of a solid.

One method of overcoming the above problems, and materially speeding up separation of red muds from alumina as well as effecting a cleaner separation of the constituents is disclosed in U.S. Pat. No. 3,390,959 wherein it is disclosed that the use of homo- or copolymers of acrylic acid and acrylates which contain not more than 20% of other ethylenically unsaturated polymerizable polar monomers as red mud flocculants improves the overall efficiency of the Bayer process.

The '959 patent teaches the use of copolymers of acrylic acid or acrylates with ethylenically unsaturated monomers as red mud flocculants, it likewise discloses, however, that when the ethylenically unsaturated monomers constitute more than 5 molar percent the separation rate dramatically drops and at more than 20 molar percent no significant separation is obtained. Although this teaching is accurate for the initial or "head" stage of the recovery circuit, it has surprisingly been found not to apply to the results obtained at the latter, more dilute stages of the caustic recovery circuit.

SUMMARY OF THE INVENTION

The present invention provides for a novel process for recovering alumina via the Bayer process wherein red muds are flocculated from the caustic recovery circuit by adding to at least the first stage of the caustic recovery circuit an effective amount of a flocculant selected from the group consisting of starch, homopolymers of acrylic acid or acrylate, copolymers of acrylic acid or acrylates containing at least 80 mole percent acrylic acid or acrylate monomers and combinations thereof and thereafter adding to some subsequent stage or stages an effective amount of a copolymer comprising from about 35 to 75 mole percent of acrylic acid or acrylate and from about 65 to 25 mole percent of acrylamide. The employment of a second, distinct polymer in the latter stages of the caustic recovery circuit where the system is more dilute and the conditions are less harsh has surprisingly shown effective flocculation of the red muds.

DETAILED DESCRIPTION OF THE INVENTION

In accordance with the present invention, there is provided a novel process for flocculating red muds produced as a byproduct in the Bayer process of recovering alumina from bauxite. This process comprises utilizing a conventional red mud flocculant in at least the first or "head" stage of the caustic recovery circuit and at some subsequent stage employing a copolymer of about 35 to 75 mole percent acrylic acid or acrylate and about 65 to 25 mole percent acrylamide as the red mud flocculant.

The conventional flocculant to be employed in at least the first stage includes starch, homopolymers of acrylic acid or acrylate, copolymers of acrylic acid or acrylate wherein the copolymer contains at least 80 mole percent acrylic acid or acrylate monomers, hydrolyzed acrylamide monomers or polymers and combinations thereof. By acrylate what is meant is the salt of an acrylic acid wherein such salts are either alkali metal, or ammonium salts. When copolymers of acrylic acid or acrylate are employed a wide variety of comonomers may be employed in amounts up to about 20 mole percent. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropenyl acetate, itaconic acid, vinyl acetate, alpha-methyl styrene, styrene, fumaric acid, aconitic acid, citraconic acid, amides of any of the foregoing acids, alkali metal derivatives (e.g., sodium, potassium and lithium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene, etc. Of the just-mentioned comonomers, greatly preferred materials among these contain a hydrophilic group in a side chain off the ethylenically unsaturated hydrocarbon group. Those monomers which do not contain such hydrophilic solubilizing group should be used in lesser amounts of say about 1-5% by weight based on total weight of monomer present.

Still other monomeric substances which may be employed in conjunction with the acrylic acid or acrylic acid salt constituent include materials such as sulfoethyl acrylate, carboxyethyl acrylate, diethyl vinyl phosphonate, crotonic acid or salts thereof, vinyl sulfonate, or salts thereof, vinyl alcohol and vinyl aryl hydrocarbons containing solubilizing groups such as sulfonates, etc.

Particularly useful homopolymers or copolymers of the type described above should preferably have a molecular weight in excess of 50,000, and more preferably in excess of 100,000. Excellent additive polymers have molecular weights even as high as ten million.

Starch materials useful in the instant invention include potato, corn, tapioca, amylose, sorghum and other readily available starches.

The effective amount of the conventional flocculant employed in at least the first stage of the caustic recovery circuit will vary depending upon the specific bauxite composition being processed, the conditions present in the recovery stage, i.e., temperature, pH, solids concentration and the like, and the red mud flocculant or flocculants employed. Generally, however, when starch or combinations containing starch is employed, the effective amount will range from 0.05 to 2.0 percent by weight of the dry mud residue. When synthetic polymers or copolymers are employed, the effective amount will generally be between 0.01 and 2.0 pounds of chemical per ton of dry mud residue.

The copolymer added to some of the subsequent stages of the caustic recovery circuit is specifically a copolymer comprising from about 35 to 75 mole percent of acrylic acid or acrylate (with acrylate being defined as set forth above) and from about 65 to 25 mole percent of acrylamide. Although it is believed that ethylenically unsaturated monomers besides acrylamide may be effectively employed in this copolymer, for considerations such as economy, availability and performance, the acrylamide comonomer is the preferred comonomer for employment in the instant inventions. These subsequently added copolymers should have a molecular weight such that the Brookfield viscosity of a 0.15% solution of the polymer in 1M NaCl at pH 8, UL adaptor at 60 r.p.m. is at least 2.0 centipoise, preferably at least 3.0 centipoise.

The effective amount for these subsequently added copolymers will also vary depending upon the specific bauxite composition being processed and the conditions present in the recovery stage. Generally, however, the effective amount will be between 0.01 and 1.0 pound of copolymer per ton of dry red mud solids, preferably about 0.05 to 0.5 pound of copolymer per ton of dry red mud solids.

At what specific stage subsequent to the initial or "head" stage in the caustic recovery circuit the copolymer comprising from about 35 to 75 mole percent acrylic acid or acrylate and from about 65 to 25 mole percent acrylamide will be effective depends upon a number of variables within the recovery system. Stage conditions such as temperature, pH, dilution of liquor, and concentration of red mud solids are believed to play an important role. The type of bauxite ore itself may also contribute to the effective location. Insofar as the exact mechanism of the interaction between the flocculant and the red mud solids is as yet unknown, the predictability as to which stage or stage variable controls the copolymer's effectiveness remains outside of simple categorization. Generally, the copolymer has been observed to be highly effective in the fourth or latter stages where the grams of NaOH plus $NaCO_3$ in the solution are less than about 100 per liter. Since this figure is extremely approximate and may rest more upon coincidence than the controlling stage variable it is recommended that the following test be undertaken to determine which stage in a given caustic recovery circuit is the effective location at which to add the copolymer. This test entails:

General Test Procedure

The stage in the caustic recovery circuit to be tested, which stage is not the "head" stage, is referred to as the "nth stage" for the purpose of this test. The (n−1)th stage washer underflow is diluted to 1:4 with nth stage washer overflow to produce a simulated nth stage washer feed. This high dilution level is necessary to produce a level of reproducible free settling in a test cylinder, preferably a 500 to 1000 ml. graduated cylinder.

To this simulated nth stage washer feed there is added the flocculant to be tested in a 0.05 weight percent solution. The solution can be either water or diluted spent liquor (NaOH). The tested dosage of flocculant is added by syringe and mixed into the simulated washer feed by five strokes of a perforated plunger. The descent of the liquid/solid interface is timed in feet per hour to determine the utility of the flocculant to the stage being tested.

Whereas the exact scope of the instant invention is set forth in the appended claims, the following specific examples illustrate certain aspects of the present invention, and more particularly, point out methods of evaluating the same. However, the examples are set forth for illustration only and are not to be construed as limitations on the present invention except as set forth in the appended claims. All parts and percentages are by weight unless otherwise specified.

EXAMPLE 1

Following the General Test Procedure set forth above, a red mud flocculant copolymer containing 60 weight percent sodium acrylate and 40 weight percent acrylamide having a molecular weight between 5–10 million was added to a simulated washer feed of an Australian red mud caustic recovery circuit wherein the initial stage was treated with a 95 weight percent sodium acrylate, 5 weight percent acrylamide copolymer. Dosages employed and settling rates obtained for the individual stages are set forth in Table I below.

COMPARATIVE EXAMPLE A

The procedure of Example 1 is followed in every material detail except for the employment of a 95 weight percent sodium acrylate, 5 weight percent acrylamide copolymer as the red mud flocculant in the test stage. Test results are set forth in Table I below.

COMPARATIVE EXAMPLE B

The procedure of Example 1 is followed in every material detail except that the red mud flocculant employed in Comparative Example A is used in addition to the red mud flocculant of Example 1. Test results are set forth in Table I below.

COMPARATIVE EXAMPLE C

The procedure of Example 1 is followed in every material detail except that there is now employed a sodium acrylate emulsion having a molecular weight of 5–10 million as the red mud flocculant. Test results are set forth in Table I below.

TABLE I

| Simulated Washer Feed Stage | Red Muds Solids Content | Flocculant (Example) | Dosage (gm/ton) | Settling Rate (Ft/Hr) |
|---|---|---|---|---|
| 2nd | 70 gm/liter | 1 | 36 | NE* |

TABLE I-continued

| Simulated Washer Feed Stage | Red Muds Solids Content | Flocculant (Example) | Dosage (gm/ton) | Settling Rate (Ft/Hr) |
| --- | --- | --- | --- | --- |
|  |  | Comp. A | 18 | 36.5 |
|  |  | Comp. A | 36 | 81.6 |
|  |  | Comp. B | 18 of 1 18 of A | 16.3 |
| 3rd | 100 gm/liter | 1 | 13 | 17.3 |
|  |  | Comp. A | 13 | 3.5 |
|  |  | Comp. C | 30 | 1.3 |
| 4th | 100 gm/liter | 1 | 13 | 27.2 |
|  |  | Comp. A | 13 | 2.8 |
|  |  | Comp. C | 30 | 1.6 |
| 5th | 100 gm/liter | 1 | 13 | 14.9 |
|  |  | Comp. A | 13 | 6.0 |
|  |  | Comp. C | 30 | 2.2 |

*NE - No EFFECT

EXAMPLE 2

A sample from a Jamaican red mud circuit is taken from the washer stage underflow and diluted according to the General Test Procedure. To this is added a flocculant in a 0.05 weight percent solution of NaOH. The flocculant tested is a 5–10 million molecular weight copolymer of sodium acrylate and acrylamide in the proportions set forth in Table II. Following the General Test Procedure in every material detail, the results listed in Table II are obtained.

TABLE II

| Simulated Washer Feed Stage | Red Muds Solids Content (gms/liter) | Flocculant Na Acrylate | (Wt %) Acrylamide | Dosage (lbs/ton) | Settling Rate (Ft/Hr) |
| --- | --- | --- | --- | --- | --- |
| 1 | 38 | 95 | 5 | 0.2 | 6.3 |
| 1 | 38 | 70 | 30 | 0.2 | NE |
| 1 | 38 | 60 | 40 | 0.2 | NE |
| 1 | 38 | 50 | 50 | 0.2 | NE |
| 3 | 27 | 95 | 5 | 0.2 | 7.6 |
| 3 | 27 | 70 | 30 | 0.2 | 30.0 |
| 3 | 27 | 60 | 40 | 0.2 | 5.5 |
| 3 | 27 | 50 | 50 | 0.2 | 3.0 |
| 3 | 27 | 40 | 60 | 0.2 | NE |
| 6 | 34 | 95 | 5 | 0.2 | 4.2 |
| 6 | 34 | 70 | 30 | 0.2 | 14.2 |
| 6 | 34 | 60 | 40 | 0.2 | 16.3 |
| 6 | 34 | 50 | 50 | 0.2 | 8.2 |
| 6 | 34 | 40 | 60 | 0.2 | 3.6 |
| 7 | 34 | 95 | 5 | 0.1 | 10.3 |
| 7 | 34 | 60 | 40 | 0.1 | 17.0 |
| 7 | 34 | 50 | 50 | 0.1 | 75.0 |
| 7 | 34 | 40 | 60 | 0.1 | 75.0 |

As can readily be seen from the foregoing data, employment of copolymers of sodium acrylate and acrylamides produce dramatic increases in flocculation at later stages in the caustic recovery circuit. Although a copolymer of 40 weight percent sodium acrylate and 60 weight percent acrylamide did not show any noticeable effect in the early stages of the test, the same copolymer produced surprisingly excellent results in a later stage, thus emphasizing the importance of evaluating the appropriateness of the individual stages in relation to the copolymer employed.

What is claimed is:

1. A process for flocculating red muds from the Bayer alumina recovery circuit which comprises adding to at least a first stage of the caustic recovery circuit an effective amount of a flocculant selected from the group consisting of starch, homopolymers of acrylic acid or acrylates, copolymers of acrylic acid or acrylates containing at least 80 molar percent acrylic acid or acrylate monomers and combinations thereof and thereafter adding to some subsequent stage or stages of the caustic recovery circuit an effective amount of a copolymer containing from about 35 to 75 molar percent of acrylic acid or acrylate monomers and from about 65 to 25 molar percent of acrylamide monomers.

2. The process of claim 1 wherein the flocculant added to at least a first stage of the caustic recovery circuit is a copolymer of acrylic acid or acrylate containing at least 90 molar percent acrylic acid or acrylate monomers and no more than 10 molar percent acrylamide monomers.

3. The process of claim 1 wherein the flocculant added to some subsequent stage or stages of the caustic recovery circuit is a copolymer containing 50 to 70 molar percent of acrylic acid or acrylate monomers and from 50 to 30 molar percent acrylamide monomers.

4. The process of claim 1 wherein the flocculant added to at least a first stage of the caustic recovery circuit is a copolymer of acrylamide acid or acrylate containing at least 90 molar percent acrylic acid or acrylate monomers and no more than 10 molar percent acrylamide monomers and wherein the flocculant added to some subsequent stage or stages of the caustic recovery circuit is a copolymer containing 50 to 70 molar percent of acrylic acid or acrylate monomers and from 50 to 30 molar percent acrylamide monomers.

5. The process of claim 1 wherein the effective amount of the first added flocculant is between 0.01 and 2.0 percent by pounds of flocculant per ton of dry mud residue and the effective amount of the subsequently added flocculant is between 0.01 and 1.0 pound of flocculant per ton of dry mud residue.

6. The process of claim 1 wherein the subsequently added flocculant is added to a stage or stages wherein the NaOH plus $Na_2CO_3$ concentration of the solution is less than about 100 grams per liter.

7. The process of claim 1 wherein the subsequently added flocculant is added to a fourth or latter stages of the caustic recovery circuit.

8. The process of claim 1 wherein the subsequently added flocculant is a copolymer containing 70 molar percent sodium acrylate and 30 molar percent acrylamide with a molecular weight in the range of 5–10 million.

* * * * *